US007606195B2

(12) United States Patent
Wang et al.

(10) Patent No.: US 7,606,195 B2
(45) Date of Patent: Oct. 20, 2009

(54) METHOD AND DEVICE FOR DYNAMICALLY SCHEDULING RADIO RESOURCES OF STREAMING MEDIA SERVICES

(75) Inventors: Yang Wang, Shanghai (CN); Liyu Cai, Shanghai (CN)

(73) Assignee: Alcatel, Paris (FR)

(*) Notice: Subject to any disclaimer, the term of this patent is extended or adjusted under 35 U.S.C. 154(b) by 420 days.

(21) Appl. No.: 11/262,602

(22) Filed: Nov. 1, 2005

(65) Prior Publication Data

US 2006/0109830 A1 May 25, 2006

(30) Foreign Application Priority Data

Nov. 8, 2004 (CN) .................. 2004 1 0067944

(51) Int. Cl.
*H04B 7/212* (2006.01)
*H04W 4/00* (2009.01)
*H04J 3/00* (2006.01)
*H04W 72/00* (2009.01)

(52) U.S. Cl. .................. 370/329; 370/322; 370/341; 455/452.2; 455/512

(58) Field of Classification Search .................. 370/329, 370/322, 341; 455/452.2, 512
See application file for complete search history.

(56) References Cited

U.S. PATENT DOCUMENTS

| 5,935,267 | A * | 8/1999 | Hayakawa | .................. 714/748 |
| 2002/0054578 | A1* | 5/2002 | Zhang et al. | .................. 370/328 |
| 2002/0197999 | A1* | 12/2002 | Wu et al. | .................. 455/452 |
| 2003/0095519 | A1* | 5/2003 | Kuo et al. | .................. 370/338 |
| 2003/0101274 | A1* | 5/2003 | Yi et al. | .................. 709/232 |

| 2004/0186877 | A1 | 9/2004 | Wang et al. |

FOREIGN PATENT DOCUMENTS

| DE | 19800953 C1 | 7/1999 |
| EP | 1528722 A1 | 5/2005 |

OTHER PUBLICATIONS

Gribanova K et al: "On scheduling video streaming data in the HDR system" Vehicular Technology Conference, 2004, VTC2004-Fall, 2004 IEEE 60th Los Angeles, CA, USA Sep. 26-29, 2004, Piscataway, NJ, USA, IEEE, Sep. 26, 2004, pp. 2572-2576, XP010787118.
Cheong Yui Wong et al: "Multiuser OFDM with Adaptive Subcarrier, Bit, and Power Allocation" IEEE Journal on Selected Areas in Communications, IEEE Service Center, Piscataway, US, vol. 17, No. 10, Oct. 1999, XP011055027.

* cited by examiner

*Primary Examiner*—Vincent P Harper
*Assistant Examiner*—Ariel Balaoing
(74) *Attorney, Agent, or Firm*—Sughrue Mion, PLLC

(57) ABSTRACT

The invention discloses a radio resources scheduling method for dynamically scheduling the radio resources of streaming media services in a multi-carrier radio communication system including multiple sub-carriers, the method comprising steps of: obtaining from a physical layer the information of the quality of radio channel on each sub-carrier for each user. The method further comprises: obtaining from a cache layer the play time information which indicates how long the data remained in the cache of receiving terminal of each user will be played continuously; and selecting in turn the users and sub-carriers corresponding to the maximums of an evaluating function based on the evaluating function obtained by a linear combination of the information of the quality of radio channel and the reciprocal of the play time information of the residual data and allocating the users to the corresponding sub-carriers.

18 Claims, 4 Drawing Sheets

METHOD AND DEVICE FOR DYNAMICALLY SCHEDULING RADIO RESOURCES OF STREAMING MEDIA SERVICES

CROSS-REFERENCE TO RELATED APPLICATION(S)

This application is based on the Chinese Patent Application No. 200410067944.7 filed on Nov. 8, 2004, the disclosure of which is hereby incorporated by reference thereto in its entirety, and the priority of which is hereby claimed under 35 U.S.C. §119.

FIELD OF THE INVENTION

The present invention relates to radio communication, and more particularly, to a method and device for dynamically scheduling radio resources of streaming media services in a multi-carrier system.

BACKGROUND OF THE INVENTION

At present, there are a good many mature dynamic radio resources scheduling methods.

For instance, the maximum throughput criterion algorithm, which dynamically schedules radio resources based on real-time channel quality. It always allocates each sub-carrier to users with the best channel quality. Apparently, this algorithm can acquire the highest throughput at the air interface theoretically. However, this method is weak in fairness. Some users with relatively bad channel quality might not get service for a long time or even for ever. Meanwhile, this dynamic resources scheduling method also fails to take into full consideration the respective characteristics of different services. In particular, for streaming media services, at some moment, perhaps the buffer of a certain user with bad channel quality will run out while data in the buffer of another user with good channel quality can still keep streaming media services uninterrupted for a considerable long time. In this case, streaming media services of users with bad channel quality will probably be interrupted if sub-carriers are still allocated to users with good channel quality in accordance with the maximum throughput criterion.

The proportional fair criterion algorithm, another example of the dynamic radio resources scheduling method, makes improvements upon the above-described maximum throughput criterion algorithm. Admittedly, this algorithm ensures that users with bad channel quality can also get some services, but it fails to consider the characteristics of different services either.

In summary, none of the existing radio resources scheduling technologies takes into full account or makes full use of the characteristics of streaming media services. Therefore, it is extremely crucial to streaming media services, which are very likely to be widely applied in a future mobile communication system, to find a method suitable for dynamically scheduling resources.

SUMMARY OF THE INVENTION

In order to transmit streaming media services better, the present invention fully considers the characteristics of streaming media services and provides a radio resources scheduling method for dynamically scheduling the radio resources of streaming media services in a multi-carrier radio communication system including multiple sub-carriers.

The method comprises steps of: obtaining from a physical layer the information of the quality of radio channel on each sub-carrier for each user. The method further comprises: obtaining from a cache layer the play time information which indicates how long the data remained in the cache of receiving terminal of each user will be played continuously; and selecting in turn the users and sub-carriers corresponding to the maximums of an evaluating function based on the evaluating function obtained by a linear combination of the information of the quality of radio channel and the reciprocal of the play time information of the residual data and allocating the users to the corresponding sub-carriers.

The present invention further provides a radio resources scheduling device for dynamically scheduling the radio resource of streaming media services in a multi-carrier radio communication system including multiple sub-carriers.

The device comprises input information collecting means for obtaining from a physical layer the information of the quality of radio channel and obtaining from a cache layer the play time information which indicates how long the data remained in the cache of receiving terminal will be played continuously; radio resources scheduling means for acquiring an evaluating function constructed by a linear combination of the information of the quality of radio channel and the reciprocal of the play time information of the residual data based on the information obtained by the input information collecting means, then selecting in turn the users and sub-carriers corresponding to the maximums of the evaluating function and for allocating the users to the corresponding sub-carriers; and scheduling result distributing means for respectively delivering the allocation result obtained from the radio resources scheduling means to a RLC layer processor in a RLC layer, an hybrid automatic repeat request device in a MAC layer and a physical layer processor in a physical layer to finish the transmission of the streaming media services.

The present invention performs joint optimization on a radio layer and a cache layer, i.e., the present invention fully considers the current state and demand of the cache layer when the radio layer, which includes a radio resource control (RRC) layer, a radio link control (RLC) layer and a medium access control (MAC) layer, performs dynamic resources scheduling.

DETAILED DESCRIPTION OF PREFERRED EMBODIMENTS

Referring to the accompanying drawings, a radio resources scheduling method and device of the present invention will be described in detail.

Figure 1:
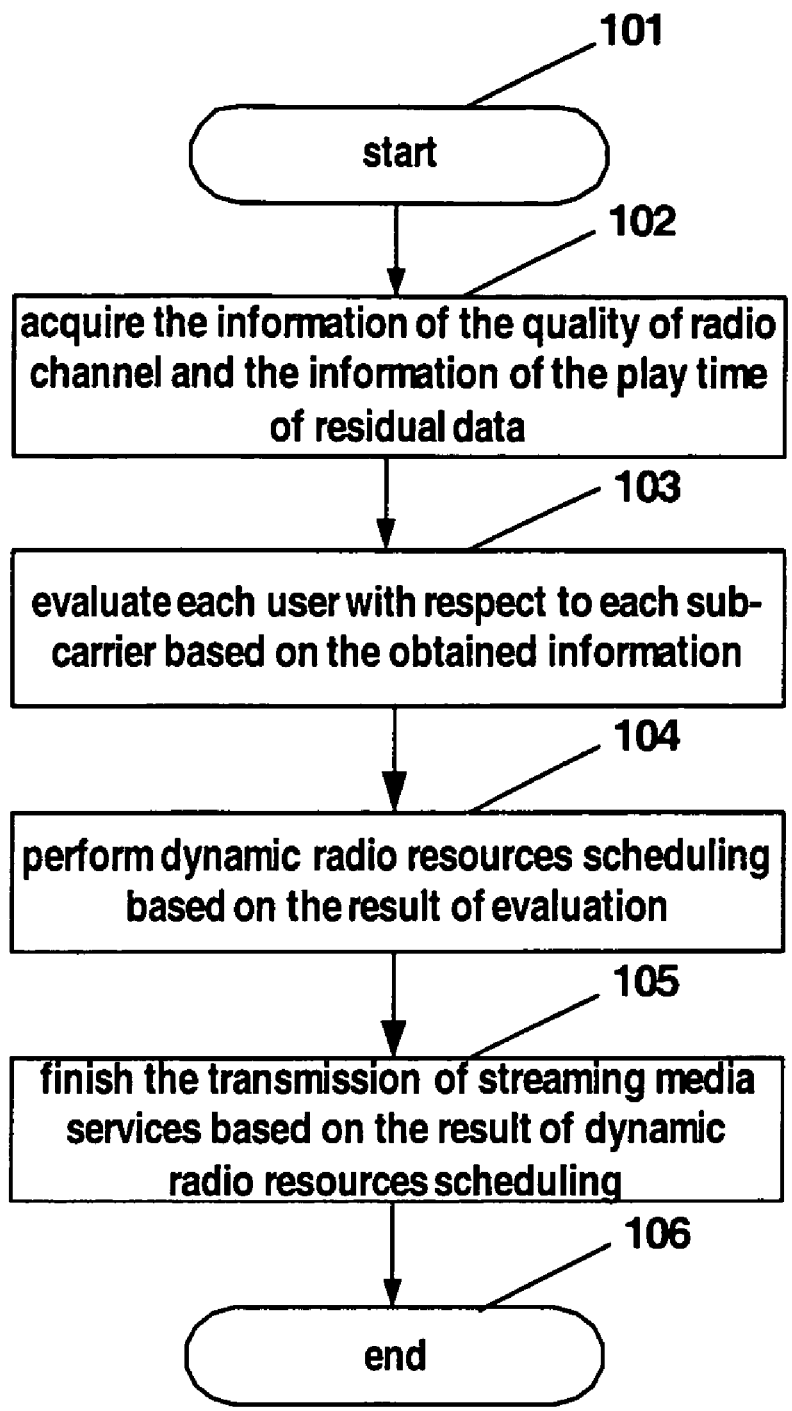
FIG. 1 is a flow chart of a radio resources scheduling method of the present invention.

The flow chart of the radio resources scheduling method according to the present invention is as shown in FIG. 1. The flow starts at step 101. In step 102, the dynamic radio resources scheduling device according to the present invention acquires the information of the quality of radio channel and the information of the play time of residual data.

The dynamic radio resources scheduling device acquires from a physical layer the information of the quality of radio channel on each sub-carrier for each user. The quality of radio channel is expressed as:

$$q(n,k), 0 \leq n \leq N-1, 0 \leq k \leq K-1 \qquad (1)$$

wherein $q(n,k)$ represents the quality of radio channel on the $k^{th}$ sub-carrier for the $n^{th}$ user, n represents the serial number of a user, N represents the total number of online users using streaming media services in a radio communication system, k represents the serial number of a sub-carrier, and K represents the total number of sub-carriers in a multi-carrier radio communication system.

The information of the play time of residual data obtained by the dynamic radio resources scheduling device from a cache layer indicates how long the data remained in the cache of each user's receiving terminal will be played continuously (hereinafter referred to as the play time of residual data). Measured by the second, the play time of residual data is expressed as:

$$t(n), 0 \leq n \leq N-1 \qquad (2)$$

wherein $t(n)$ indicates how long the data remained in the cache of the $n^{th}$ user's receiving terminal will be played continuously.

Afterwards, the flow shown in FIG. 1 enters step 103. In this step, evaluation is made on each user with respect to each sub-carrier based on the information obtained in step 102. The evaluation synthetically considers the aforesaid quality of radio channel and the remaining play time. In view of this, an evaluating function is structured as;

$$e(n,k)=w \cdot q(n,k)+(1-w)/t(n), 0 \leq n \leq N-1, 0 \leq k \leq K-1, 0 \leq w \leq 1 \qquad (3)$$

wherein $e(n, k)$ represents the evaluation result on the $k^{th}$ sub-carrier for the $n^{th}$ user, and w is a weight.

As is clear from equation (3), the evaluating function is a linear combination of the quality of radio channel and the reciprocal of the remaining play time. By adjusting the weight w, either of the two characteristics, the quality of radio channel and the remaining play time, can be chosen to be focally evaluated in accordance with needs. Preferably, a relative value of the quality of radio channel can be used to express the quality of the radio channel. That is, firstly, the scheduling device determines a user and sub-carrier with the best channel quality:

$$q_{max} = \max_{\substack{0 \leq n \leq N-1 \\ 0 \leq k \leq K-1}} q(n,k) \qquad (4)$$

wherein $q_{max}$ represents a value of the best channel quality.

Then, a relative value of the quality of radio channel is expressed as:

$$q(n,k)/q \qquad (5)$$

Thus, the evaluating function $e(n, k)$ for each user with respect to each sub-carrier according to the present invention is expressed as:

$$e(n,k)=w \cdot q(n,k)/q_{max}+(1-w)/t(n), 0 \leq n \leq N-1, 0 \leq k \leq K-1, 0 \leq w \leq 1 \qquad (6)$$

wherein $e(n, k)$ represents the evaluation result on the $k^{th}$ sub-carrier for the $n^{th}$ user.

Next, the flow shown in FIG. 1 enters step 104. In this step, dynamic radio resources scheduling is implemented in accordance with the foregoing evaluation result. After that, the flow enters step 105. In this step, the dynamic radio resources scheduling device reports the result of dynamic radio resources scheduling obtained in step 104 to an RLC layer, the physical layer, an HARQ means etc. for corresponding processing, respectively, to finish the transmission of streaming media data of the air interface based on the multi-carrier technology. Finally, the flow shown in FIG. 1 ends at step 106.

Figure 2:
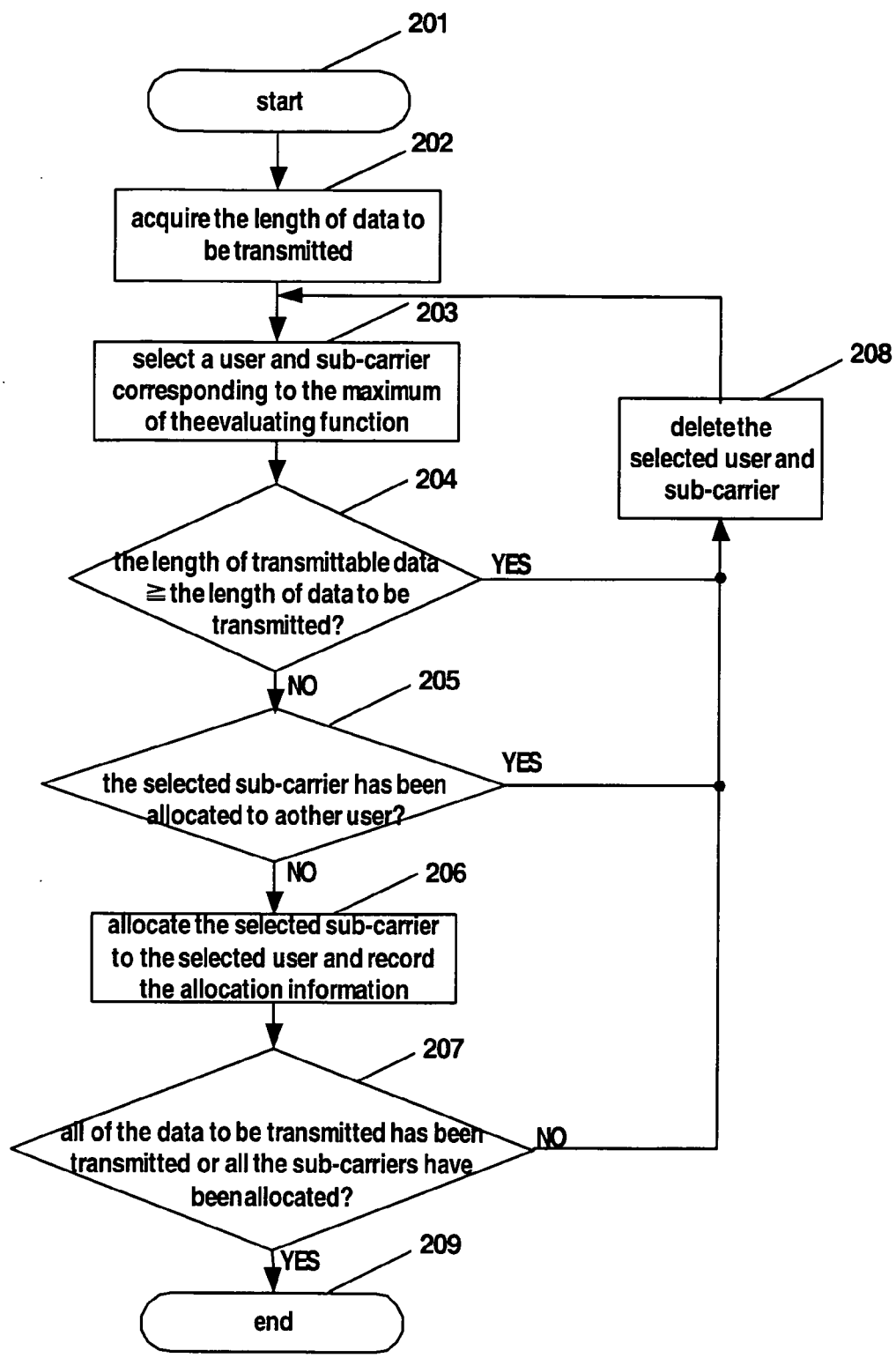
FIG. 2 illustrates the detailed steps of radio resources scheduling in the flow chart of FIG. 1.

The detailed flow of step 104 in FIG. 1 is as shown in FIG. 2. Illustrated in FIG. 2 are detailed steps of performing dynamic radio resources scheduling in a scheduling cycle based on the result of evaluation on each user with respect to each sub-carrier.

The flow shown in FIG. 2 starts with step 201. In step 202, the dynamic radio resources scheduling device acquires from the RLC layer the length of the data to be transmitted in the RLC cache of transmitting terminal of each user. Measured by the bit, the length of the data to be transmitted is expressed as:

$$s(n), 0 \leq n \leq N-1 \qquad (7)$$

wherein $s(n)$ represents the length of the data to be transmitted in the RLC cache of transmitting terminal of the $n^{th}$ user.

It should be noted that, after each scheduling cycle for dynamically allocating resources starts, the radio communication system will re-allocate the length of transmittable data to each user and re-allocate respective sub-carrier to each user based on the foregoing evaluation result. That is to say, at the beginning of each scheduling cycle, none of sub-carriers is allocated to a corresponding user, and the length $d(n)$ of transmittable data corresponding to each user is zero, which is expressed as:

$$d(n)=0, 0 \leq n < N-1 \qquad (8)$$

wherein $d(n)$ is the length of transmittable data corresponding to the $n^{th}$ user. The length of transmittable data is in a unit of bit.

Following step 202, the flow shown in FIG. 2 enters step 203. In this step, a pair of the users and sub-carriers corresponding to the maximum of the evaluating function is selected. In the present embodiment, this selection is made according to expression (6):

$$(n^*, k^*) = \underset{\substack{0 \leq n \leq N-1 \\ 0 \leq k \leq K-1}}{\operatorname{argmax}} e(n, k) \qquad (9)$$

Equation (9) means the selected n* and k* corresponding to the maximum of $e(n,k)$.

Next, the flow enters step 204. In this step, it is decided whether the length d (n*) of transmittable data that has been allocated to the selected user n* is greater than or equal to the length s(n*) of data to be transmitted in the RLC cache of this user. When it is decided that the length d (n*) of transmittable data that has been allocated to the selected user n* is greater than or equal to the length s(n*) of data to be transmitted in the RLC cache of this user, this means that the resources allocation at this very moment satisfies the user's needs, and then the flow shown in FIG. 2 enters step 208. In step 208, the selected user n* and the sub-carrier k* are deleted from the evaluated pairs of user and sub-carrier. Then, the flow returns to step 203 to select a next pair of user and sub-carrier corresponding to the maximum of the evaluating function and to perform subsequent allocation and scheduling.

When it is decided in step 204 that the length d (n*) of transmittable data that has been allocated to the selected user n* is smaller than the length s(n*) of data to be transmitted in the RLC cache of this user, the flow shown in FIG. 2 enters step 205.

It should be noted that, at the beginning of each scheduling cycle, since the length d(n) of transmittable data corresponding to each user is zero, the decision result from step 204 is "no" so long as this user has data to be transmitted in the RLC cache. Then, the flow enters step 205.

In step 205, it is decided whether the selected sub-carrier k* has been allocated to other user. When the sub-carrier k* has been allocated to other user, then the flow shown in FIG. 2 enters step 208. In step 208, the selected user n* and sub-carrier k* are deleted from the pairs of evaluated user and sub-carrier. After that, the flow returns to step 203 to select a next pair of user and sub-carrier corresponding to the maximum of the evaluating function and to perform subsequent allocation and scheduling.

When it is decided in step 205 that the sub-carrier k* has not been allocated to other user, the flow shown in FIG. 2 enters step 206. In this step, the selected sub-carrier k* is allocated to the selected user n* and the allocation information is recorded. The detailed flow of step 206 will be explained with reference to FIG. 3.

Following step 206 as shown in FIG. 2, the flow enters step 207. In step 207, it is decided whether all the data to be transmitted in the RLC cache has been transmitted or all the sub-carriers have been allocated. When all the data to be transmitted in the RLC cache has been transmitted or all the sub-carriers have been allocated, the flow shown in FIG. 2 ends at step 209 to finish a scheduling cycle. Otherwise, the flow shown in FIG. 2 enters step 208. In this step, the selected n* and sub-carrier k* are deleted from the pairs of evaluated user and sub-carrier. After that, the flow returns to step 203 to select a next pair of user and sub-carrier corresponding to the maximum of the evaluating function and to perform subsequent allocation and scheduling.

Figure 3:
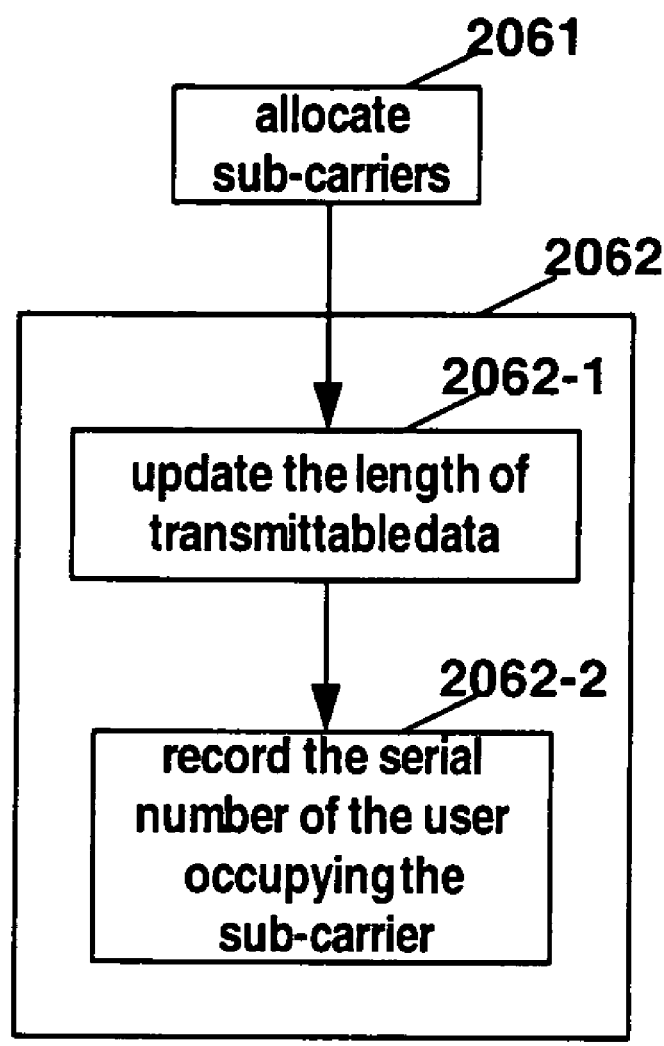
FIG. 3 is a detailed flow of the step of allocating the selected sub-carriers to the selected users and recording allocation information in FIG. 2.

FIG. 3 illustrates in detail the flow of step 206 in FIG. 2. Step 206 in FIG. 2 includes steps 2061 and 2062. In step 2061, the selected sub-carrier k* is allocated to the selected user n*. Then, the corresponding allocation information is recorded in step 2062. The step of recording the corresponding allocation information includes steps 2062-1 and 2062-2.

In step 2062-1, the length of transmittable data of the selected user n* is updated. The updated length d (n*) of transmittable data of the selected user n*, which equals to the sum of the original length d (n*) of transmittable data of this user and the length d' of transmittable data on the current selected sub-carrier k*, will serve as the new length d (n*) of transmittable data corresponding to this user.

Preferably, the length d' of transmittable data on the sub-carrier k* for the user n* can be determined according to the adaptive modulation and coding (AMC) algorithm. However, it is to be understood that the present invention is not limited to the AMC algorithm.

Then, the serial number n* of the user occupying the sub-carrier k* is recorded in step 2062-2. Finally, the flow shown in FIG. 2 ends at step 206.

Those skilled in the art should appreciate that in the dynamic radio resources scheduling method according to the present invention, step 202 (the step of acquiring from the RLC layer data to be transmitted in the RLC cache of each user) in FIG. 2 can be arranged after any step prior to step 204 (the step of deciding whether the length of transmittable data of the user is greater than the length of data to be transmitted in the RLC cache of this user) in FIG. 2. In addition, the order of the steps 2062-1 and 2062-2 can be exchanged. Different arrangements of order for the above steps are not intended to limit the present invention.

Figure 4:
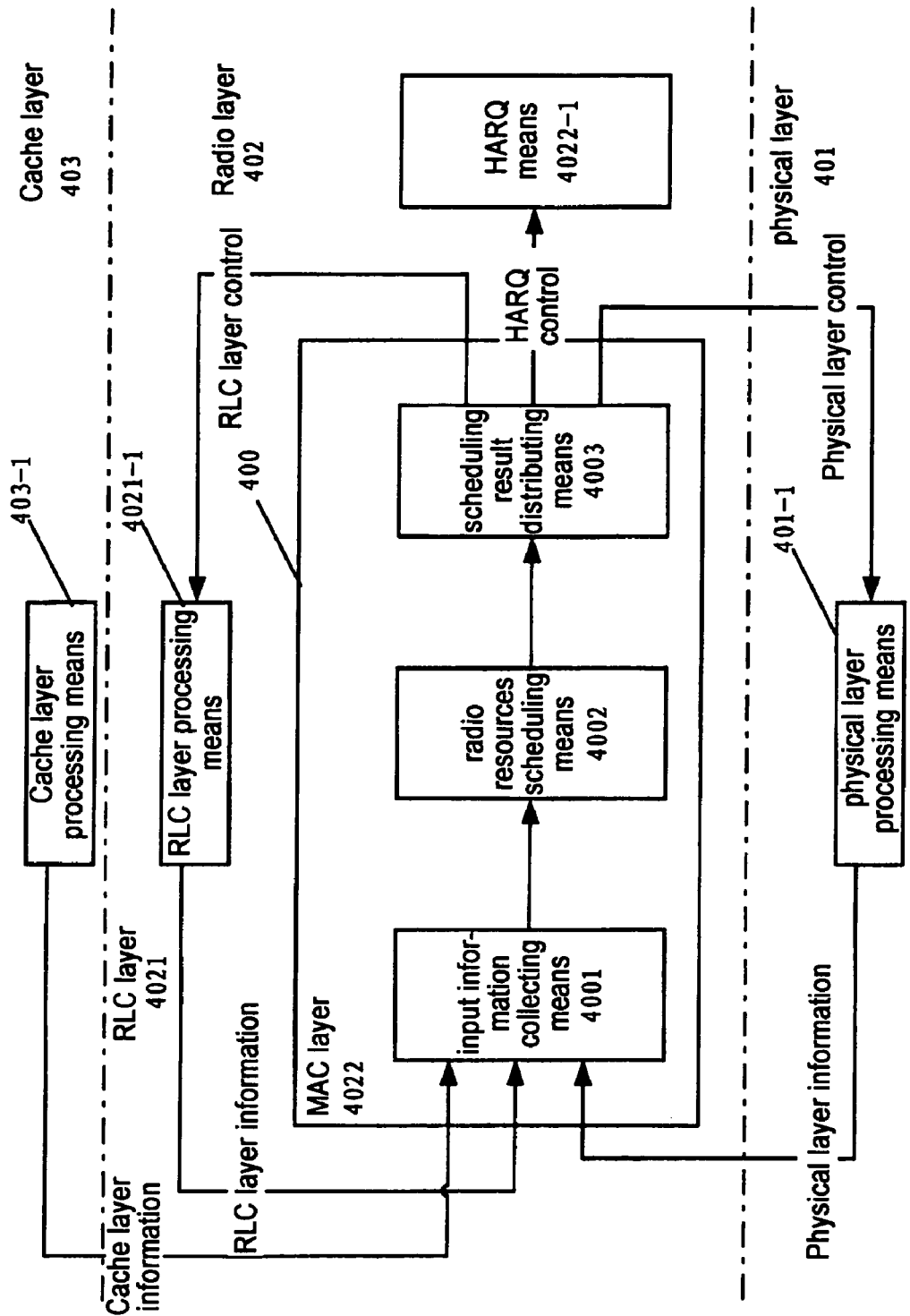
FIG. 4 is a schematic view of the inner structure of a radio resources scheduling device according to the present invention and a related hierarchical structure.

FIG. 4 is a schematic view of the inner structure of a radio resources scheduling device according to the present invention and a related hierarchical structure.

A radio communication system of the present invention comprises K sub-carriers with the serial number of k, the respective serial numbers of the sub-carriers being 0, 1, . . . K−1. In the access point coverage area of the radio communication system, there are N online users, with the serial number of n, using streaming media services, the respective serial numbers of the users being 0, 1, . . . N−1.

In the aforesaid radio communication system, layers related to the present invention include a physical layer 401, a radio layer 402 and a cache layer 403. Among them, the radio layer 402 includes a radio link control (RLC) layer 4021 and a medium access control (MAC) layer 4022. A dynamic radio resources scheduling device 400 is carried out in the MAC layer 4022.

The dynamic radio resources scheduling device 400 comprises: input information collecting means 4001, radio resources scheduling means 4002 and scheduling result distributing means 4003. The input information collecting means 4001 obtains the following information:

1) obtaining from physical layer processing means 401-1 in the physical layer 401 physical layer information, which is the information of the quality q(n, k) of radio channel in the present embodiment;
2) obtaining from RLC layer processing means 4021-1 in the RLC layer 4021 the information of RLC layer, which is the length information s(n) of data to be transmitted in the present embodiment; and
3) obtaining from cache layer processing means 403-1 in the cache 403 cache layer information, which is the information of the play time of residual data in the cache of receiving terminal in the present embodiment.

After reception of the aforesaid information sent by the input information collecting means 4001, the radio resources scheduling means 4002 obtains an evaluating function using a linear combination of the information of the quality q(n,k) of radio channel and the reciprocal of the information of the play time of residual data in the cache of receiving terminal. The radio resources scheduling means 4002 selects in turn the users and sub-carriers corresponding to the maximum of the evaluating function and allocates said users to the corresponding sub-carriers as a result of dynamic radio resources scheduling. The scheduling result distributing means 4003 respectively delivers the result of dynamic radio resources scheduling to the RLC layer processing means 4021-1 in the RLC layer 4021, hybrid automatic repeat request means 4022-1 in the MAC layer 4022 and the physical layer processing means 401-1 in the physical layer 401 to perform the transmission of streaming media services.

During radio resources scheduling, the dynamic radio resources scheduling method and device according to the present invention full consider the characteristics of streaming media services and make rational use of information provided by the cache layer to optimize radio resources scheduling. Therefore, the interruption probability and re-buffer probability of streaming media services are reduced effectively, and the degree of satisfaction of terminal users is enhanced.

Various variations and modifications can be made without departing from the concept and scope of the present invention. It is to be understood that the present invention is not limited to the foregoing concrete embodiments thereof except as defined in the appended claims.

What is claimed is:

1. A radio resources scheduling method for dynamically scheduling the radio resources of streaming media services in a multi-carrier radio communication system including multiple sub-carriers, the method comprising:

obtaining from a physical layer the information of the quality of radio channel on each sub-carrier for each user;

obtaining from a cache layer play time information which indicates how long the data remained in the cache of receiving terminal of each user will be played continuously; and selecting in turn the users and sub-carriers corresponding to the maximums of an evaluating function based on the evaluating function obtained by a linear combination of said information of the quality of radio channel and the reciprocal of the play time information of the residual data and allocating said users to the corresponding sub-carriers.

2. The radio resources scheduling method as claimed in claim 1, further comprising:

transmitting streaming media services in accordance with said allocating said users to the corresponding sub-carriers.

3. The radio resources scheduling method as claimed in claim 1, wherein said information of the quality of radio channel is a relative value of the quality of radio channel on each sub-carrier for each user.

4. The radio resources scheduling method as claimed in claim 1, further comprising:

obtaining from a radio link control (RLC) layer a length (s(n)) of data to be transmitted in an RLC cache of transmitting terminal of each user.

5. The radio resources scheduling method as claimed in claim 4, wherein said allocating said users to the corresponding sub-carriers comprising:

recording a serial number (n*) of said selected user occupying said sub-carrier (k*); and updating a length (d(n*)) of transmittable data of said selected user (n*).

6. The radio resources scheduling method as claimed in claim 5, wherein in said updating the length (d(n*)) of the transmittable data of said selected user (n*), the sum of the length d(n*) of transmittable data of said selected user (n*) and a length (d') of transmittable data on the current selected sub-carrier (k*) of the user (n*) is used as the updated length of transmittable data corresponding to the user (n*).

7. The radio resources scheduling method as claimed in claim 6, wherein the original length d(n*) of transmittable data of each user equals zero at the beginning of each scheduling cycle.

8. The radio resources scheduling method as claimed in claim 6, wherein the length (d') of transmittable data on the sub-carrier (k*) of said selected user (n*) is determined by adaptive modulation and coding (AMC) algorithm.

9. The radio resources scheduling method as claimed in claim 4, wherein said evaluating and scheduling further comprises:

deciding whether all of data to be transmitted in said RLC cache has been transmitted or whether all of said sub-carriers have been allocated;

when all of the data to be transmitted in said RLC cache has been transmitted or all of said sub-carriers have been allocated, finishing the allocation of said sub-carriers; and when not all of the data to be transmitted in said RLC cache has been transmitted and not all of said sub-carriers have been allocated, deleting said selected user (n*) and sub-carrier (k*) from the pairs of user and sub-carrier to be selected, selecting a new pair of user and sub-carrier corresponding to the maximum of said evaluating function and performing said subsequent allocation.

10. A radio resources scheduling device for dynamically scheduling the radio resource of streaming media services in a multi-carrier radio communication system including multiple sub-carriers, the device comprising:

input information collecting means for obtaining from a physical layer the information of the quality of radio channel and obtaining from a cache layer the play time information which indicates how long the data remained in the cache of receiving terminal will be played continuously;

radio resources scheduling means for acquiring an evaluating function constructed by a linear combination of said information of the quality of radio channel and the reciprocal of the play time information of the residual data based on the information obtained by the input information collecting means, then selecting in turn the users and sub-carriers corresponding to the maximums of the evaluating function and for allocating said users to the corresponding sub-carriers; and scheduling result distributing means for respectively delivering the allocation result obtained from said radio resources scheduling means to a RLC layer processor (4021-1) in a RLC layer, an hybrid automatic repeat request (HARQ) device in a MAC layer and a physical layer processor in a physical layer to finish the transmission of said streaming media services.

11. The radio resources scheduling device as claimed in claim 10, wherein the input information collecting means obtains from the RLC layer the information of the length of data to be transmitted.

12. The radio resources scheduling method as claimed in claim 5, further comprising:

determining whether the length (d(n*)) of transmittable data of said selected user (n*) is greater than or equal to the length (s(n)) of data to be transmitted in the RLC cache of the transmitting terminal.

13. The radio resources scheduling method as claimed in claim 12, wherein, if the length (d(n*)) of transmittable data of said selected user (n*) is greater than or equal to the length (s(n)) of data to be transmitted in the RLC cache of the transmitting terminal, the selected user n* and the sub-carrier k* are deleted from the evaluated pairs of user and sub-carrier.

14. The radio resources scheduling method as claimed in claim 12, wherein, if the length (d(n*)) of transmittable data of said selected user (n*) is smaller that length (s(n)) of data to be transmitted in the RLC cache of the transmitting terminal, the method further comprising:

determining whether the selected sub-carrier k* has been allocated to another user.

15. The radio resources scheduling method as claimed in claim 14, wherein, if the selected sub-carrier k* has been allocated to another user, the selected user n* and sub-carrier k* are deleted from the pair of evaluated user and sub-carrier.

16. The radio resources scheduling method as claimed in claim 15, wherein a next pair of user and sub-carrier corresponding to the maximum of the evaluation function is selected.

17. The radio resources scheduling method as claimed in claim 14, wherein, if the selected sub-carrier k* has not been allocated to another user, the selected sub-carrier k* is allocated to the selected user n* and the allocation information is recorded.

18. The radio resources scheduling method as claimed in claim 14, wherein the evaluation equation is $$e(n,k)=w\cdot q(n,k)/q_{max}+(1-w)/t(n), 0\leq n\leq N-1, 0\leq k\leq K-1, 0\leq w\leq 1,$$

where $q(n,k)$ represents the quality of radio channel on $k^{th}$ sub-carrier for $n^{th}$ user, n represents a serial number of the user, N represents total number of online users using streaming media services in the radio communication system, k represents the serial number of a sub-carrier, K represents the total number of sub-carriers in a multi-carrier radio communication system, $t(n)$ indicates how long the data remained in the cache of the $n^{th}$ user's receiving terminal will be played continuously, $e(n, k)$ represents the evaluation result on the $k^{th}$ sub-carrier for the $n^{th}$ user, and w is a weight.

* * * * *